(12) United States Patent
Alaze et al.

(10) Patent No.: US 6,189,984 B1
(45) Date of Patent: Feb. 20, 2001

(54) HYDRAULICALLY ACTUATED STOP VALVE AND HYDRAULIC BRAKE SYSTEM FOR A VEHICLE

(75) Inventors: Norbert Alaze, Markgroeningen; Heinz Siegel, Stuttgart; Rolf Hummel, Steinenbronn; Thomas Michl, Stuttgart; Martin Maier, Moeglingen; Guenther Hohl, Stuttgart, all of (DE)

(73) Assignee: Robert Bosch GmbH, Stuttgart (DE)

(*) Notice: Under 35 U.S.C. 154(b), the term of this patent shall be extended for 0 days.

(21) Appl. No.: 09/180,405

(22) PCT Filed: Jan. 9, 1998

(86) PCT No.: PCT/DE98/00054

§ 371 Date: Nov. 9, 1998

§ 102(e) Date: Nov. 9, 1998

(87) PCT Pub. No.: WO98/40257

PCT Pub. Date: Sep. 17, 1998

(30) Foreign Application Priority Data

Mar. 13, 1997 (DE) .............................................. 197 10 426
Jul. 31, 1997 (DE) .............................................. 197 32 988

(51) Int. Cl.$^7$ ...................................................... B60T 8/36
(52) U.S. Cl. ......................................... 303/119.2; 137/509
(58) Field of Search .............................. 303/119.2, 115.2, 303/119.3; 137/509, 467, 461

(56) References Cited

U.S. PATENT DOCUMENTS 3,880,476 * 4/1975 Belart et al. ........................ 303/119.2
5,026,126 * 6/1991 Umasankar et al. .............. 303/119.2
5,906,219 * 5/1999 Lavery .................................. 137/467

FOREIGN PATENT DOCUMENTS

320485 * 5/1957 (CH) .................................... 137/509
762028 * 9/1996 (EP) .................................... 137/467

* cited by examiner

Primary Examiner—Robert J. Oberleitner
Assistant Examiner—Devon Kramer
(74) Attorney, Agent, or Firm—Ronald E. Greigg; Edwin E. Greigg

(57) ABSTRACT

The invention relates to a hydraulically actuated cutoff valve which is provided as an intake valve for switching between a master cylinder and an intake side of a feed pump of a slip-controlled vehicle brake system. The invention sets forth that the cutoff valve is embodied with a valve closing body that has a valve tappet which passes through an annular actuating element and is in engagement with a rocker element embodied as a cup spring, which rests on an annular pivot bearing. If the actuating element is acted upon by pressure, it presses down an outer edge of the rocker element, and as a result a middle of the actuating element executes a pivoting motion in the opposite direction that closes the cutoff valve. The invention has the advantage of an economical cutoff valve that has only a small number of components, and the invention can be used in a hydraulic vehicle brake system.

9 Claims, 3 Drawing Sheets

HYDRAULICALLY ACTUATED STOP VALVE AND HYDRAULIC BRAKE SYSTEM FOR A VEHICLE

PRIOR ART

The invention relates to a hydraulically actuated cutoff valve and a hydraulic brake system for a vehicle, which can be equipped with such a cutoff valve.

One such valve is known from European Patent Disclosure EP 0 606 840 B1. The known valve has a valve housing with a partition on which a valve seat is formed. Disposed on one side of the partition is a piston as an actuating element, which is pressed by a valve opening spring in the direction of the partition and can be displaced away from the partition by imposition of pressure. Located on the other side of the partition is a valve ball acting as a valve closing body, which is lifted from the valve seat by the piston and is pressed in the direction of the valve seat by a valve closing spring which is weaker than the valve opening spring. The known valve is open in its basic position and is closed by imposition of a pressure that is above a closing pressure.

The known valve has the disadvantage of being expensive to produce. In particular, the valve housing has to be machined on both sides of the valve seat. It is large, and it requires two springs, which must be tuned to one another to established desired switching pressures. Using two springs operating contrary to one another presents a high risk that the switching pressures will vary over the course of valve use.

This valve is a component of a hydraulic vehicle brake system which is arranged to limit drive slip by automatically braking driven wheels and to that end has at least one self-aspirating feed pump, which is supplied with brake fluid through the open valve and through a master cylinder from its supply container. The hydraulic vehicle brake system also includes a pressure buildup valve and pressure reduction valve assemblies connected to wheel brake cylinders, by means of the assemblies, for instance in the traction control mode, brake fluid fed by the feed pump to generate brake pressure can be carried to at least one wheel brake cylinder.

ADVANTAGES OF THE INVENTION

The cutoff valve of the invention has only three moving parts, namely the valve closing body, the actuating element, and a rocker element, which transmits a motion of the actuating element to the valve closing body. These parts are simple in geometry and can therefore be produced inexpensively. They can be accommodated in a cylindrical bore, which can have a cone on an annular shoulder acting as its valve seat. The cutoff valve of the invention can be produced economically at little effort, is maintenance-free, and suffers only slight wear, so that it has a long useful life.

The cutoff valve of the invention is intended in particular for use as an intake valve for a hydraulic vehicle brake system that has a pump, that is, as an example for a vehicle brake system with antilock, traction control, or driving dynamics control and/or an external force vehicle brake system. The cutoff valve is disposed between a master cylinder and an intake side of the pump; it is preferably open in its basic position, and it has a large flow cross section, so that when the master cylinder is not actuated and the pump is not on, it will throttle a stream of brake fluid aspirated from a supply container through the master cylinder as little as possible, thereby assuring a rapid pressure buildup. The pressure buildup upon actuation of the master cylinder closes the cutoff valve, so that the intake side of the pump is hydraulically disconnected from the master cylinder, and brake fluid can flow unhindered out of the wheel brake cylinders through a brake pressure reduction valve during an anti-lock control mode or the like.

A hydraulic vehicle brake system of the above generic type, offers the advantage that in automatic braking, two open valve cross sections in a parallel circuit are available between the master cylinder and an inlet of a feed pump, so that the self-aspirating feed pump can become well filled and accordingly is capable of pumping well.

The definite characteristics set forth result in an exemplary embodiment in which one of the intake valves is electrically controllable and accordingly makes the hydraulic vehicle brake system capable of driving dynamics control operation and/or external force braking operation when the brake pedal is actuated.

The definitive characteristics set forth herein result in an exemplary embodiment that in the traction control mode, by automatic braking, by means of the hydraulically controllable intake valve, furnishes a large valve cross section in an economical and space-saving way.

The definitive characteristics found herein result in an exemplary embodiment that is more advantageous for driving dynamics control operation and/or external force braking operation.

BRIEF DESCRIPTION OF THE DRAWINGS

The invention will be described in further detail below in terms of an exemplary embodiment shown in the drawing. Shown are.

DESCRIPTION OF THE EXEMPLARY EMBODIMENTS

Figure 1:
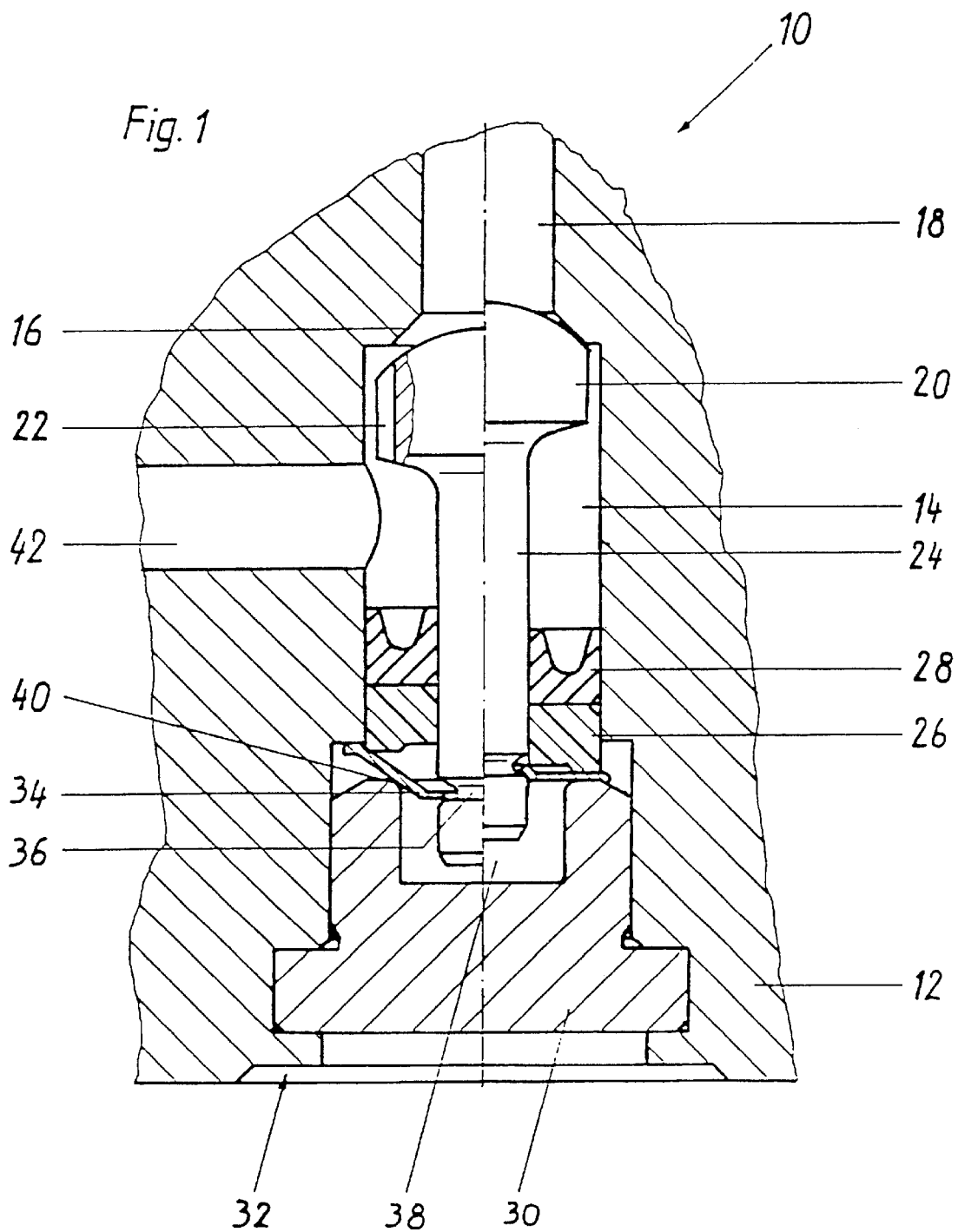
FIG. 1 illustrates an axial section through a cutoff valve of the invention.

The hydraulically actuated cutoff valve of the invention shown in FIG. 1 and identified overall by reference numeral 10 is a 2/2-way valve. It is inserted into a hydraulic block, of which the drawing shows only a fragment containing the cutoff valve 10. Via the hydraulic block, the cutoff valve 10 communicates hydraulically with other components of a vehicle brake system, such as magnet valves, a master cylinder, and/or a pump. The hydraulic block forms a valve housing 12 and will hereinafter be called by that name.

The valve housing 12 has a cylindrical bore, which forms a valve chamber 14. On one end of the valve chamber 14, an annular shoulder is made with a conical valve seat 16 at which an axial fluid conduit 18 discharges.

A spherical valve closing body 20 is axially displaceably supported in the valve chamber 14 and is shown in the drawing in two halves, one in a closed position and one in an open position. This body has lengthwise ribs 22 on its circumference. The lengthwise ribs 22 serve the purpose of axially guiding the valve closing body 20 in the valve chamber 14 and enable a virtually unthrottled flow around the valve closing body 20.

The valve closing body 20 is integral with a valve tappet 24, which is disposed axially in the valve chamber 14 and protrudes from the valve closing body 20 on a side remote from the valve seat 16.

The valve tappet 24 protrudes through an annular actuating element 26 of substantially annular cross section which is located on a face end of the valve chamber 14, remote from the valve seat 16. The actuating element 26 fills an interstice between the valve tappet 24 and a wall of the valve chamber 14 and has a clearance fit both with the valve tappet 24 and with the wall of the valve chamber 14. It thus guides the valve tappet 24 axially and is itself guided axially displaceably in the valve chamber 14. For sealing purposes, a cuff sealing ring 28 is disposed on a face end toward the valve seat 16 of the actuating element 26; it provides sealing between the wall of the valve chamber 14 and the valve tappet 24. Instead of the cuff sealing ring 28, a seal between the outer circumference of the actuating element 26 and the wall of the valve chamber 14, for instance, and a seal between the inner circumference of the actuating element 26 and the valve tappet 24 may be provided (not shown). These seals are sealing rings, preferably O-rings, placed for instance in grooves of the actuating element 26. The annular actuating element 26 and the cuff sealing ring 28 are shown in split halves with each half in different positions within the valve chamber 14.

The valve chamber 14 is closed by means of a stopper 30 inserted into its mouth and caulked at 32 in fluid-tight fashion. Between the stopper 30 and the actuating element 26, there is a rocker element 34 in the form of a cup spring. With slits extending from the outer circumference inward and/or from the inner circumference outward, the elasticity of the rocker element 34 can be varied.

The rocker element 34 engages a groove 36 of the valve tappet 24. The actuating element 26 is located near the outer circumference on the rocker element 34. In a middle region between the valve tappet 24 and the outer circumference, the rocker element 34 rests on a circular edge, which is formed on an end face of the stopper 30 toward the rocker element 34 by means of a cup-shaped recess 38. The annular edge forms a pivot bearing 40 for the rocker element 34.

A radial second fluid conduit 42 discharges into the valve chamber 14 in the region between the cuff seal 28 and the valve closing body 20. The valve seat 16 is accordingly located between the two fluid conduits 18 and 42.

The function of the cutoff valve of the invention is as follows: In a basic position, shown in the left half of FIG. 1, of the cutoff valve 10 of the invention, the rocker element 34 embodied as a cup spring lifts the valve closing body 20 away from the valve seat 16, so that there can be a flow through the cutoff valve 10 in both directions. The exemplary embodiment of a cutoff valve 10 of the invention shown in the drawing is accordingly open, in its basic position.

If the valve chamber 14 and thus via the cuff seal 28 the actuating element 26 are acted upon by a pressure which is above a switching pressure, the actuating element 26 together with the cuff seal 28 is displaced in the axial direction counter to the spring force of the rocker element 34 and presses the rocker element down on its outer circumference, toward the stopper 30. As a result, in terms of its cross section, the rocker element 34 is pivoted about the pivot bearing 40 and presses the valve closing body 20 sealingly against the valve seat 16 via the valve tappet 24, so that the cutoff valve 10 is closed. The closed switching position of the cutoff valve 10 is shown in the right half of FIG. 1. In actuality, the rocker element 34 embodied as a cup spring is pressed elastically flat by the actuating element 26, in the course of which its outer edge moves in the direction of the stopper 30 and an inner edge, which is in engagement with the groove 36 of the valve tappet 24, moves in the direction of the valve seat 16. If the pressure in the valve chamber 14 drops below the switching pressure determined by the elastic spring force of the rocker element 34, then the spring force of the rocker element 34 returns the cutoff valve 10 to its open basic position again.

Figure 2:
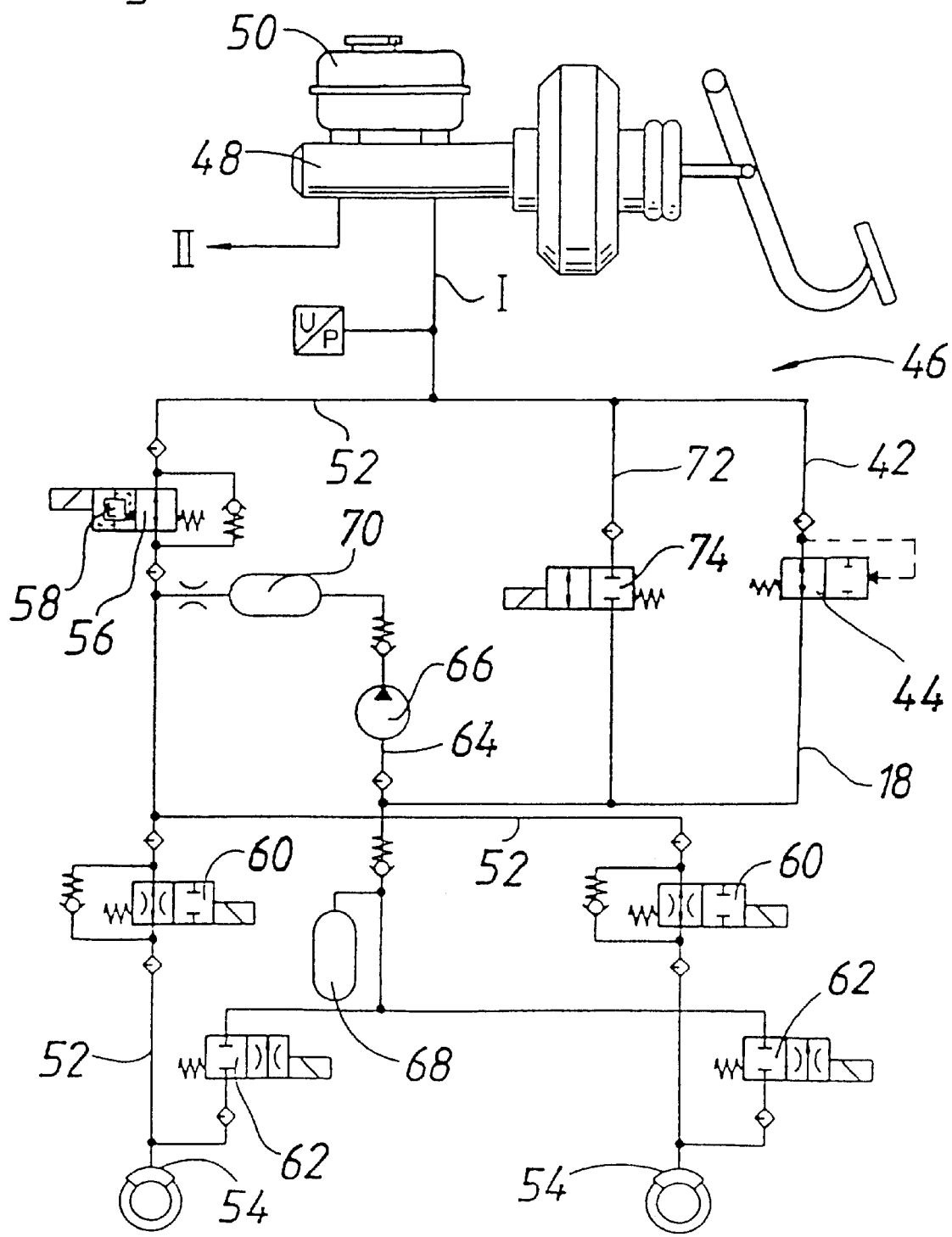
FIG. 2 illustrates a hydraulic circuit diagram of a vehicle brake system of the invention.

The cutoff valve 10 (FIG. 1) is intended according to the invention for use as a hydraulically actuated intake valve 44 in the vehicle brake system shown in FIG. 2. FIG. 2 shows a brake circuit I of a dual-circuit vehicle brake system 46. Brake circuit II, not shown, is identical in design to the brake circuit I shown and functions in the same way.

The vehicle brake system 46 has a tandem master cylinder 48 with a supply container 50. A branching master brake line 42 leads from the master cylinder 48 to wheel brake cylinders 54 connected to this brake circuit I. A switchover valve 56 which is open in its basic position and has an integrated pressure limiting valve 58 is incorporated into the master brake line 52. Each wheel brake cylinder 54 is preceded by a pressure buildup valve 60 which is open in its basic position.

Each wheel brake cylinder 54 also has a pressure reduction valve 62 which is closed in its basic position, and from which valve a common return line 64 leads to the master brake line 52 and discharges between the switchover valve 56 and the pressure buildup valves 60. A feed pump 66 is incorporated into the return line 64 and is preceded by a reservoir 68 and followed by a damper 70.

The pressure buildup valve 60 and the pressure reduction valve 62 form a brake pressure modulation valve assembly of the respective wheel brake cylinder 54, with which in a manner known per se the brake pressure in the wheel brake cylinder 54 can be modulated, in order to prevent or limit slip of the corresponding vehicle wheel upon braking (ABS mode), upon startup (traction control), or to vary lateral guidance of a vehicle wheel by purposeful braking, to prevent the vehicle from spinning (driving dynamics control).

The brake pressure modulation is accomplished with the aid of the feed pump 66. The switchover valve 56 can be closed during the brake pressure modulation, to prevent effects on the master cylinder 48. The pressure buildup valve 60 and pressure reduction valve 62 may for instance also be combined into one 3/3-way valve, instead of the two separate 2/2-way valves shown.

An intake line 72 leads from the master cylinder 48 to an intake side of the feed pump 66. An intake valve 74 which is closed in its basic position is disposed in the intake line 72. Through the intake line 72, when the intake valve 74 is open, the feed pump 66 aspirates brake fluid directly from the master cylinder 48, which is a prerequisite for a fast pressure buildup.

The intake valve 74, like the switchover valve 56 and the pressure buildup and pressure reduction valves 60, 62, is embodied as a magnet valve. A flow cross section of the intake valve 74 is limited for structural reasons, and the intake valve 74 acts as a throttle restriction when brake fluid is aspirated from the master cylinder 48 by the feed pump 66. To enlarge the available total flow cross section, according to the invention the hydraulically actuated cutoff valve 10 (FIG. 1) is connected parallel to the intake valve as an additional intake valve 44 74 embodied as a magnet valve. The flow resistance when brake fluid is aspirated from the master cylinder 48 by the feed pump 66 is thereby further reduced, and the pressure buildup is speeded up. Since for structural reasons, the hydraulically actuatable intake valve 44 makes a considerably larger flow cross section possible than that of the electromagnetically actuated intake valve 74, and does so in a simple way, the aspiration resistance can be reduced substantially at little effort.

The additional intake valve 44 is, as explained in terms of the cutoff valve 10 shown in FIG. 1, open in its basic position, so that the feed pump 66 can aspirate from the supply container 50 when the master cylinder 48 is not actuated. If the master cylinder 48 is actuated, then via the intake line 72 the valve chamber 14 of the cutoff valve 10 (FIG. 1) is acted upon by pressure and the latter is closed; that is, the additional intake valve 44 (FIG. 2) switches automatically under hydraulic control and need not be controlled electrically.

The hydraulically actuatable additional intake valve 44 can in some features of the invention also replace the intake valve 74 embodied as a magnet valve.

Figure 3:
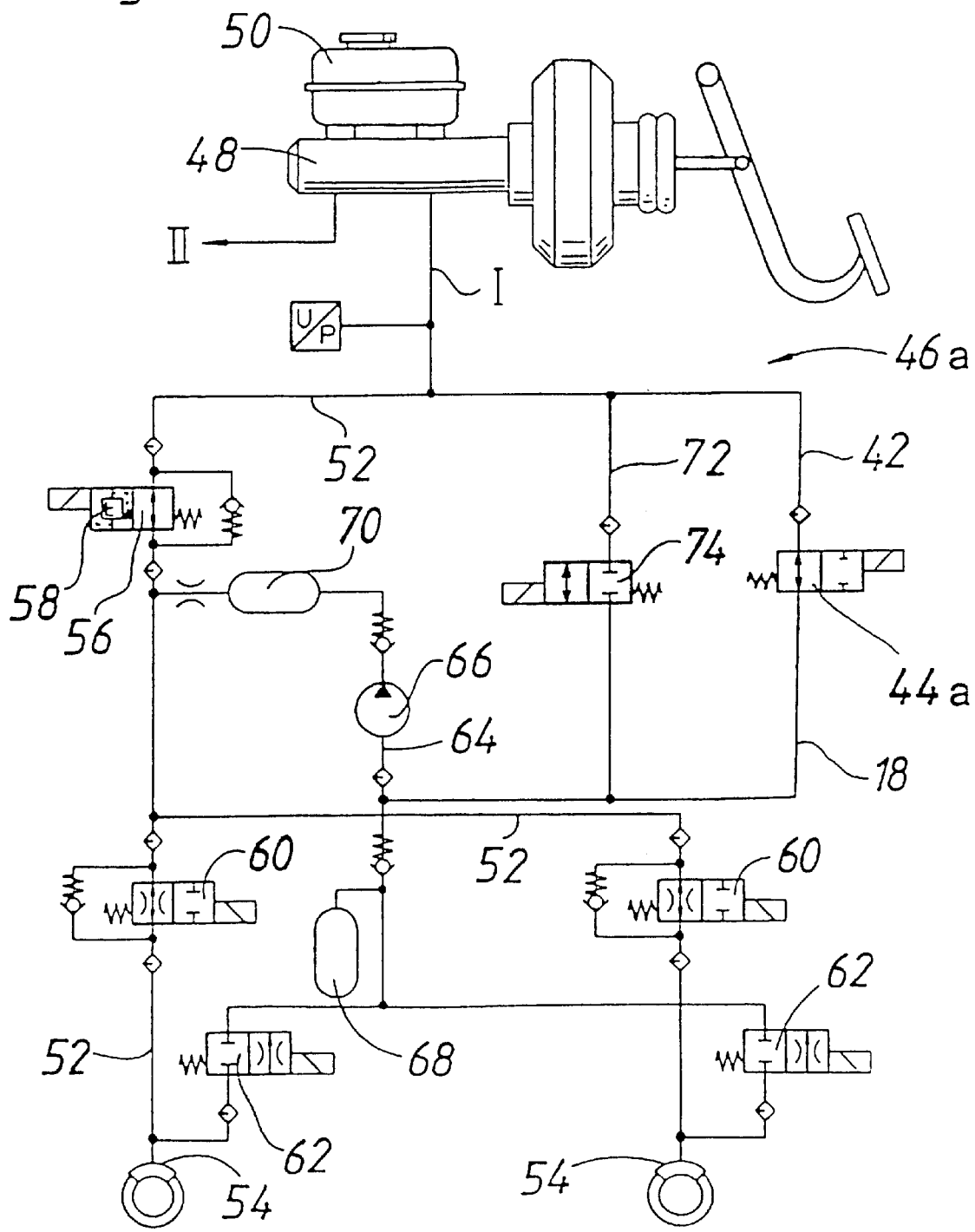
FIG. 3 illustrates a further hydraulic circuit diagram of a vehicle brake system of the invention.

In the exemplary use shown in FIG. 2, the axial fluid conduit 18 shown in FIG. 1 connects the intake valve 44 with the low-pressure side of the feed pump 66. In the exemplary use of FIG. 2, the second fluid conduit 42, discharging radially into the valve chamber 14 (FIG. 1), connects the master cylinder 48 with the intake valve 44. As already noted, the intake valve 44 shown symbolically in FIG. 2 may be embodied according to the invention like the cutoff valve 10 shown in FIG. 1. In other words, the additional intake valve may also be embodied in a different way from FIG. 1 and in that case can be selected from the prior art, for instance. To that end, intake valves or at least intake valve elements in accordance with international patent disclosures WO 94/29149 and WO 97/10132 may for instance be considered, or alternatively a copy of the intake valve 74 embodied as a magnet valve may for instance be considered, which is indicated symbolically in the alternative hydraulic circuit diagram of FIG. 3 by reference numeral 44a. In an adaptation to this, the dual-circuit vehicle brake system of FIG. 3 is then assigned reference numeral 46a. A copy of the intake valve 74 can be made on a scale of 1:1, for instance, for the sake of being structurally identical.

The foregoing relates to a preferred exemplary embodiment of the invention, it being understood that other variants and embodiments thereof are possible within the spirit and scope of the invention, the latter being defined by the appended claims.

What is claimed is:

1. A hydraulically actuated cutoff valve comprising a valve closing body that is adjusted into a closing position and into an opening position, an actuating element that is acted upon by pressure in a valve chamber, the cutoff valve (10, 44) has a rocker element (34), which is pivoted by the actuating element (26) when a pressure above a switching pressure is imposed on the actuating element (26) which thereby actuates the valve closing body (20), and the rocker element (34) has a restoring spring element, which presses the valve closing body (20) into a basic open position.

2. The hydraulically actuated cutoff valve of claim 1, in which the rocker element (34) is embodied as a cup spring.

3. The hydraulically actuated cutoff valve of claim 1, in which the rocker element (34) is embodied as a leaf spring.

4. The hydraulically actuated cutoff valve of claim 1, in which the actuating element (26) is embodied annularly and is received axially displaceably in a valve chamber (14) on which pressure acts; that the valve closing body (20) has a valve tappet (24) which passes through the actuating element (26), and the actuating element (26) is sealed off from the valve chamber (14) and from a valve tappet (24); that the valve tappet (24) is in engagement with the rocker element (34) embodied as a cup spring, said cup spring in a region between a middle area and an outer circumference rests on an annular pivot bearing (40); and that the actuating element (26), when pressure is impinged on the valve chamber (14), rests on the rocker element (34) radially outside the pivot bearing (40).

5. The hydraulically actuated cutoff valve of claim 2, in which the actuating element (26) is embodied annularly and is received axially displaceably in a valve chamber (14) on which pressure acts; that the valve closing body (20) has a valve tappet (24) which passes through the actuating element (26), and the actuating element (26) is sealed off from the valve chamber (14) and from a valve tappet (24); that the valve tappet (24) is in engagement with the rocker element (34) embodied as a cup spring, said cup spring in a region between a middle area and an outer circumference rests on an annular pivot bearing (40); and that the actuating element (26), when pressure is impinged on the valve chamber (14), rests on the rocker element (34) radially outside the pivot bearing (40).

6. The hydraulically actuated cutoff valve of claim 3, in which the actuating element (26) is embodied annularly and is received axially displaceably in a valve chamber (14) on which pressure acts; that the valve closing body (20) has a valve tappet (24) which passes through the actuating element (26), and the actuating element (26) is sealed off from the valve chamber (14) and from a valve tappet (24); that the valve tappet (24) is in engagement with the rocker element (34) embodied as a cup spring, said cup spring in a region between a middle area and an outer circumference rests on an annular pivot bearing (40); and that the actuating element (26), when pressure is impinged on the valve chamber (14), rests on the rocker element (34) radially outside the pivot bearing (40).

7. The hydraulically actuated cutoff valve of claim 1, in which the cutoff valve (10, 44) has a valve seat (16), against which the restoring spring element (34) presses the valve closing body (20).

8. A hydraulically actuated cutoff valve comprising a valve closing body that is adjusted into a closing position and into an opening position, an actuating element that is acted upon by pressure in a valve chamber, the cutoff valve (10, 44) has a rocker element (34), which is pivoted by the actuating element (26) when a pressure above a switching pressure is imposed on the actuating element (26) which thereby actuates the valve closing body (20), the actuating element (26) is embodied annularly and is received axially displaceably in a valve chamber (14) on which pressure acts; that the valve closing body (20) has a valve tappet (24) which passes through the actuating element (26), and the actuating element (26) is sealed off from the valve chamber (14) and from a valve tappet (24); that the valve tappet (24) is in engagement with the rocker element (34) embodied as a cup spring, said cup spring in a region between a middle area and an outer circumference rests on an annular pivot bearing (40); and that the actuating element (26), when pressure is impinged on the valve chamber (14), rests on the rocker element (34) radially outside the pivot bearing (40).

9. The hydraulically actuated cutoff valve of claim 8 in which the rocker element (34) is embodied as a leaf spring.

\* \* \* \* \*

UNITED STATES PATENT AND TRADEMARK OFFICE
CERTIFICATE OF CORRECTION

PATENT NO. : 6,189,984 B1
DATED : February 20, 2001
INVENTOR(S) : Norbert Alaze et al It is certified that error appears in the above-identified patent and that said Letters Patent is hereby corrected as shown below:

The Title page item 54, should read as follows:

(54) HYDRAULICALLY ACTUATED CUTOFF VALVE AND HYDRAULIC BREAK SYSTEM FOR A VEHICLE

Signed and Sealed this
Fifth Day of June, 2001

*Attest:*

NICHOLAS P. GODICI

*Attesting Officer*

*Acting Director of the United States Patent and Trademark Office*